United States Patent
Lee et al.

(10) Patent No.: US 8,639,957 B2
(45) Date of Patent: Jan. 28, 2014

(54) METHOD AND APPARATUS FOR REDUCING POWER CONSUMPTION IN DIGITAL LIVING NETWORK ALLIANCE NETWORK

(75) Inventors: Young-Kow Lee, Suwon-si (KR); Tae-Hwan Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 12/954,725

(22) Filed: Nov. 26, 2010

(65) Prior Publication Data

US 2011/0138208 A1 Jun. 9, 2011

(30) Foreign Application Priority Data

Dec. 4, 2009 (KR) .................... 10-2009-0119669

(51) Int. Cl.
*G06F 1/32* (2006.01)
(52) U.S. Cl.
USPC ........... 713/323; 713/324; 709/224; 709/228; 345/2.3
(58) Field of Classification Search
USPC ................... 713/323, 324; 709/18, 224, 228; 345/2.3
See application file for complete search history.

(56) References Cited

U.S. PATENT DOCUMENTS

| | | | |
|---|---|---|---|
| 5,953,677 A | 9/1999 | Sato | |
| 7,076,245 B1 | 7/2006 | Satapathy | |
| RE41,482 E * | 8/2010 | Oh | 348/730 |
| 7,779,283 B2 * | 8/2010 | Huang et al. | 713/323 |
| 7,983,651 B2 * | 7/2011 | Minematsu et al. | 455/343.2 |
| 8,223,834 B2 * | 7/2012 | Goto et al. | 375/240.01 |
| 8,270,297 B2 * | 9/2012 | Akasaka et al. | 370/235 |
| 8,295,769 B2 * | 10/2012 | Bloebaum | 455/41.3 |
| 8,400,441 B2 * | 3/2013 | Kim | 345/212 |
| 2006/0109825 A1 | 5/2006 | Abdel-Kader et al. | |
| 2007/0226351 A1 | 9/2007 | Fischer et al. | |
| 2008/0201751 A1 * | 8/2008 | Ahmed et al. | 725/109 |
| 2008/0305839 A1 | 12/2008 | Karaoguz et al. | |
| 2010/0079508 A1 * | 4/2010 | Hodge et al. | 345/697 |
| 2010/0115318 A1 * | 5/2010 | Suzuki et al. | 713/323 |
| 2011/0072285 A1 * | 3/2011 | Fischer et al. | 713/320 |

FOREIGN PATENT DOCUMENTS

| | | | |
|---|---|---|---|
| JP | 2007-164080 A | 6/2007 | |
| WO | 2006/021847 A1 | 3/2006 | |

OTHER PUBLICATIONS

Kalofonos et al., A Network Connectivity Power-Saving Mechanism For Mobile Devices in DLNA Home Networks, IEEE, Jan. 1, 2007, pp. 645-649.

* cited by examiner

*Primary Examiner* — Thuan Du
(74) *Attorney, Agent, or Firm* — Jefferson IP Law, LLP

(57) ABSTRACT

A method and apparatus for reducing power consumption in a DLNA (Digital Living Network Alliance) network is provided. A method for operating a digital media renderer to reduce power consumption in a DLNA network includes receiving media content from a digital media server, and controlling the power of a communication connection device and a display according to the control state of the received media content.

19 Claims, 7 Drawing Sheets

METHOD AND APPARATUS FOR REDUCING POWER CONSUMPTION IN DIGITAL LIVING NETWORK ALLIANCE NETWORK

PRIORITY

This application claims the benefit under 35 U.S.C. §119(a) of a Korean patent application filed in the Korean Intellectual Property Office on Dec. 4, 2009 and assigned Serial No. 10-2009-0119669, the entire disclosure of which is hereby incorporated by reference.

BACKGROUND OF THE INVENTION

1. Field of the Invention

The present invention relates to Digital Living Network Alliance (DLNA). More particularly, the present invention relates to a method and apparatus for reducing power consumption in a DLNA network.

2. Description of the Related Art

Various devices are used in homes, such as information devices (e.g., Personal Computers (PCs)), communication devices (e.g., telephones), broadcasting devices (e.g., TVs), and Audio/Video (AV) devices (e.g., Digital Video Disks (DVDs) and digital cameras). Home automation has been proposed and used to automatically control such devices.

In the early stages of development, home automation systems controlled home appliances separately by telephones or infrared rays. Home automation systems did not support a connection between the home appliances. However, recent development of communication technology provides a method of constructing a network between home appliances and integrating/managing the home appliances by a controller. This system is referred to as a home network system.

The home network system connects various network home appliances (e.g., TVs, washing machines, microwave ovens, gas ranges, audios, air conditioners, and boilers), lighting, gas valves, and front doors to controllers (e.g., home gateways and home servers), and controls the connected appliances through a specific terminal (e.g., a remote controller).

Recently, standardization of home network systems is in progress. The Digital Living Network Alliance (DLNA) standard has been proposed for controlling information home appliances (e.g., TVs, Video Tape Recorders (VTRs), digital cameras, and audio systems). The DLNA standard focuses on sharing all the content provided from information home appliances. For example, the use of the DLNA standard allows home devices to share various digital media content stored in personal devices (e.g., mobile devices or computers), thereby enabling users to enjoy the digital media content conveniently regardless of the locations and devices in homes.

However, during the use of the DLNA service, the activation of a Wireless Local Area Network (WLAN) and a display device results in significant power consumption. A portable device (e.g., a mobile communication terminal) consumes most of its power at a display and an RF chipset, which may reduce the lifetime of the portable terminal. Accordingly, a method and apparatus for reducing power consumption in a DLNA network is desired.

SUMMARY OF THE INVENTION

An aspect of the present invention is to address at least the above-mentioned problems and/or disadvantages and to provide at least the advantages described below. Accordingly, an aspect of the present invention is to provide a method for reducing power consumption in a Digital Living Network Alliance (DLNA) network.

Another aspect of the present invention is to provide an apparatus for reducing power consumption in a DLNA network.

According to an aspect of the present invention, a method for operating a digital media renderer to reduce power consumption in a DLNA network is provided. The method includes, receiving media content from a digital media server, and controlling the power of at least one of a communication connection device and a display according to the control state of the received media content.

According to another aspect of the present invention, a method for operating a digital media server to reduce power consumption in a DLNA network is provided. The method includes, determining whether a digital media renderer or a digital media player is in a connection state, and terminating the connection if the digital media renderer or the digital media player is not in the connection state or if there is no command from the digital media renderer or the digital media player for a predetermined time.

According to another aspect of the present invention, a method for operating a digital media server to reduce power consumption in a DLNA network is provided. The method includes, determining whether at least one digital media renderer or digital media player are in a connection state, and notifying the connection state a user if at least one digital media renderer or digital media player is not in the connection state.

According to another aspect of the present invention, a method for reducing power consumption in a DLNA network is provided. The method includes, controlling the power of a display according to a control state of media content received from a digital media server, disconnecting the power of a communication connection device or converting the communication connection device to a power save mode, after completion of buffering the received media content, and interrupting the power of the communication connection device after displaying a pop-up window to a user when the communication connection device is disconnected.

According to another aspect of the present invention, a system for reducing power consumption in a DLNA network is provided. The system includes, a digital media renderer for controlling the power of a display according to a control state of media content received from a digital media server, for disconnecting the power of a communication connection device or converting the communication connection device to a power save mode after completion of buffering the received media content, and for interrupting the power of the communication connection device after displaying a pop-up window to a user when the communication connection device is disconnected, and a digital media server for determining whether the digital media renderer is in a connection state, and for terminating the connection if the digital media renderer or digital media player is not in the connection state.

According to another aspect of the present invention, a system for reducing power consumption in a Digital Living Network Alliance (DLNA) network is provided. The system includes a digital media server for storing and providing digital media content; a digital media renderer including a communication connection device for communicating with the digital media server and a display for reproducing the digital media content; a digital media controller for identifying digital media content stored in the digital media server, for requesting the digital media server to transmit the identified digital media content to the digital media renderer, wherein the digital media renderer controls the power of the display according to a control state of the digital media content received from a digital media server, disconnects the power of the communication connection device or converts the communication connection device to a power save mode after completion of buffering the received media content, and interrupts the power of the communication connection device after displaying a pop-up window to a user when the communication connection device is disconnected, and wherein the digital media server determines whether the digital media renderer is in a connection state, and terminates a connection between the digital media server and the digital media renderer if the digital media renderer is not in the connection state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for reducing power consumption in a Digital Living Network Alliance (DLNA) network.

Figure 1:
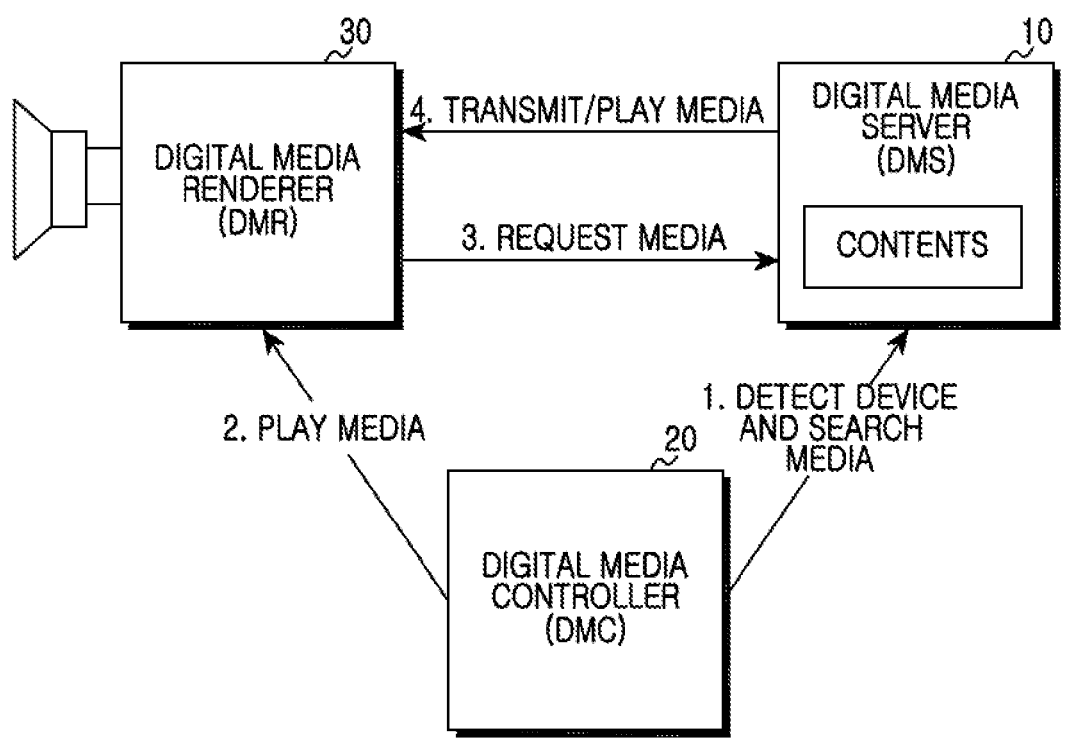
FIG. 1 is a block diagram illustrating a Digital Living Network Alliance (DLNA) network according to an exemplary embodiment of the present invention.

FIG. 1 is a block diagram illustrating a Digital Living Network Alliance (DLNA) network according to an exemplary embodiment of the present invention.

Referring to FIG. 1, a DLNA network may include a Digital Media Server (DMS) 10, a Digital Media Controller (DMC) 20, and a Digital Media Renderer (DMR) 30. The DMS 10, the DMC 20, and the DMR 30 may perform wired/wireless communication (e.g., using a Wireless Local Area Network (WLAN)) between them. The DMS 10 stores media content (e.g., moving pictures and image files). The media content may be broadcast signals received in real time. The DMC 20 searches the DMS 10 for media content. The DMC 20 requests the DMR 30 to play the corresponding media content of the DMS 10, and the DMR 30 requests the DMS 10 to provide the DMR 30 with the media content requested by the DMC 20. Thereafter, the DMS 10 transmits the corresponding media content to the DMR 30, and the DMR 30 plays the received media content.

The DLNA network may be implemented by three component entities as described above. However, the DLNA network may also be implemented by two component entities as described below with respect to FIG. 2.

Figure 2:
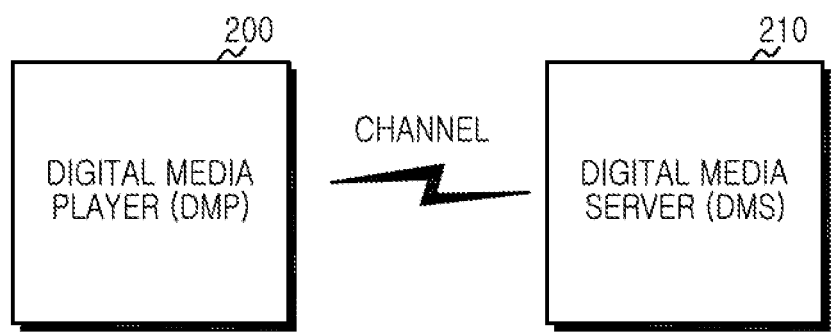
FIG. 2 is a block diagram illustrating a DLNA network according to an exemplary embodiment of the present invention.

FIG. 2 is a block diagram illustrating a DLNA network according to an exemplary embodiment of the present invention.

Referring to FIG. 2, two component network entries are shown, a Digital Media Player (DMP) 200 and a DMS 210. The DMP 200 may operate as the DMC 20 and the DMR 30 illustrated in FIG. 1, and the DMS 210 may be the same as the DMS 10 illustrated in FIG. 1. The DMP 200 and the DMS 210 perform wired/wireless communication therebetween.

Figure 3:
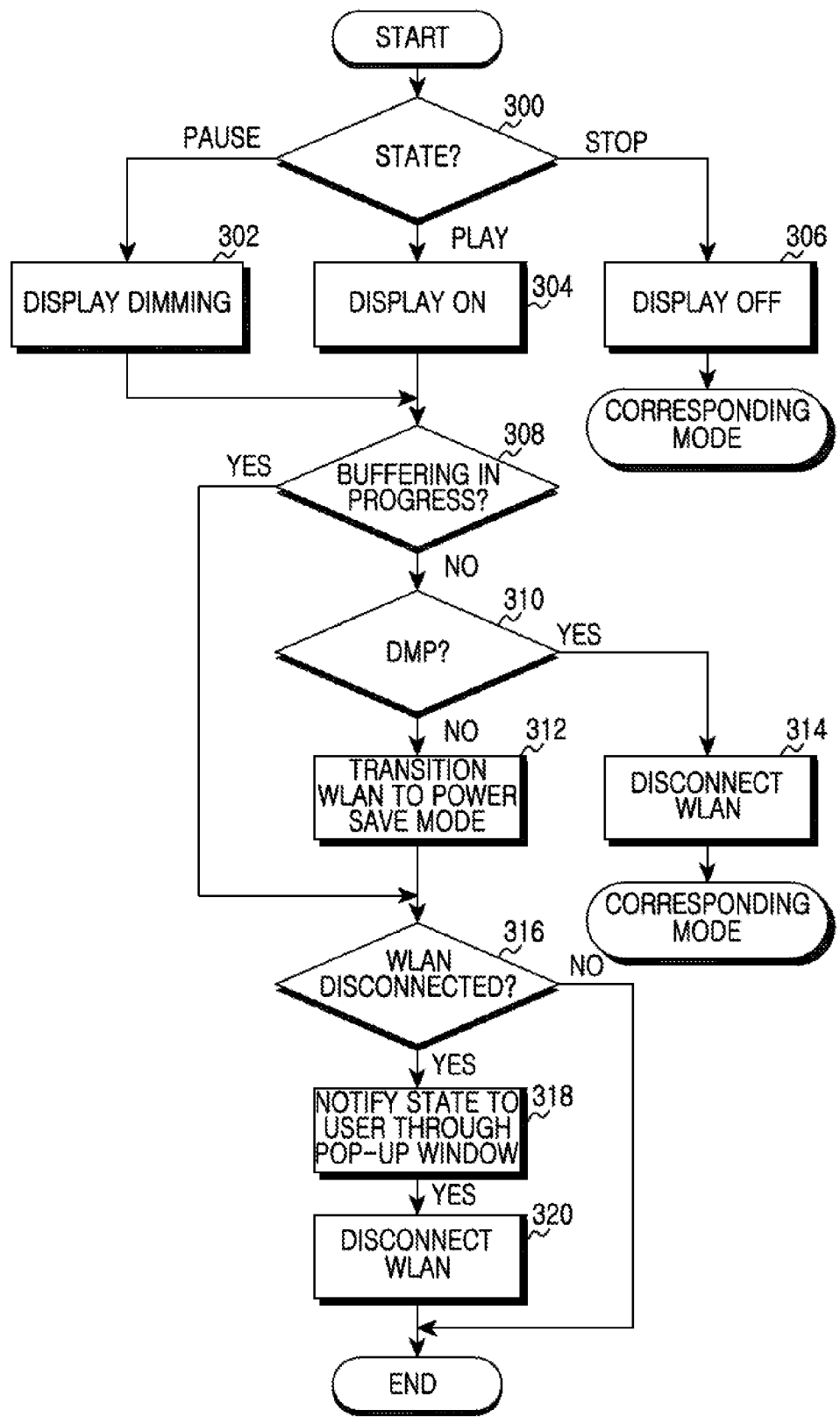
FIG. 3 is flow diagram illustrating a method for operating a digital media renderer to reduce power consumption in a DLNA network according to an exemplary embodiment of the present invention.

FIG. 3 illustrates a method for operating a DMR to reduce power consumption in a DLNA network according to an exemplary embodiment of the present invention. An operation of the DMC 20 for reducing power consumption in the DLNA network may be the same as an operation of the DMR 30, and thus a description thereof will be omitted for conciseness.

Referring to FIG. 3, in step 300, the DMR determines whether the operation state is a pause state, a play state or a stop state. For example, under the control of the DMC 20, the DMR 30 determines whether it is playing the content received from the DMS 10 or pauses/stops the play of the content received from the DMS 10.

If the operation state is a pause state in step 300, then in the event of the continuance of the pause state for a predetermined time, the DMR dims a display, such as a Liquid Crystal Display (LCD) to minimize the power consumption in step 302.

If the operation state is a play state in step 300, the DMR turns on the display to operate the display in step 304. The DMR continues to operate the display to display the played content.

If the operation state is a stop state in step 300, the DMR turns off the display to reduce the power consumption in step 306. Thereafter, the DMR proceeds to a corresponding mode. In the corresponding mode, the DMR waits for a control signal from the DMC.

In step 308, the DMR determines whether a buffering operation is in progress. The DMR determines whether it is receiving/buffering the content from the DMS. If a buffering operation is in progress (i.e., the DMR is receiving/buffering the content from the DMS in step 308), the DMR maintains a normal connection state of a WLAN in step 316 and uses the WLAN to receive/buffer the content from the DMS. If a buffering operation is not in progress (i.e., the DMR completes the reception of the content from the DMS in step 308), the DMR determines whether it operates as DMP in step 310.

If the DMR operates as a DMP in step 310, the DMR disconnects the WLAN used to transmit the content from DMS in step 314. When the DMR completes the buffering operation and operates as a DMP, the DMR powers down the WLAN to reduce the power consumption. When the DMR is to transmit a command to the DMS, the DMR reconnects the WLAN to transmit the command to the DMS.

If the DMR does not operate as a DMP (i.e., the DMR/DMC function is divided in step 310), the DMR transitions the WLAN to a power save mode in step 312. The reason for transitioning the WLAN to a power save mode if the DMR does not operate as a DMP is that the DMC may transmit a control signal to the DMR even when the DMR does not receive the content from the DMS. Also, it is to maintain a power save mode of the WLAN in the play state after completion of the buffering operation.

In step 316, the DMR determines whether the DMR or the DMS disconnects from the WLAN (e.g., if a WLAN connection is difficult to maintain due to an increase in the distance from the DMR or the DMS). If the DMR or the DMS disconnects from the WLAN in step 316, the DMR notifies the user of the WLAN state through a pop-up window if the DMR is in a play state or a pause state in step 318. In step 320, the DMR disconnects the WLAN to reduce the power consumption, if a predetermined time elapses without roaming.

On the other hand, if the DMR or the DMS does not disconnect from the WLAN in step 316, the DMR continues to supply power to the WLAN or to maintain the power save mode.

Figure 4:
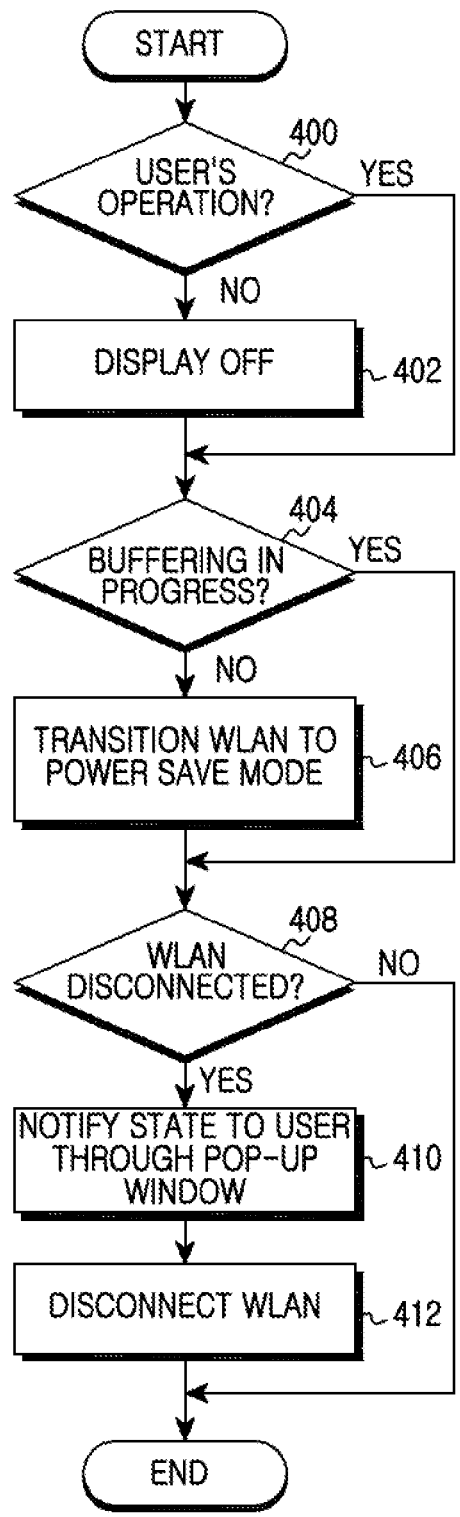
FIG. 4 is flow diagram illustrating a method for operating a digital media server to reduce power consumption in a DLNA network according to an exemplary embodiment of the present invention.

FIG. 4 illustrates a method for operating a DMS to reduce power consumption in a DLNA network according to an exemplary embodiment of the present invention.

Referring to FIG. 4, in step 400, the DMS determines whether there is a user operation. If there is no user operation in step 400, then in step 402, regardless of the state of the DMR and DMC or DMP, the DMS turns off a display (such as an LCD) to reduce the power consumption. According to an exemplary embodiment of the present invention, if the DMS is operating, this operation state may be displayed in other ways (e.g., a periodic LED on/off, and an operation indication on a display screen).

If there is a user operation in step 400, the DMS determines in step 404 whether the DMR or the DMP is buffering the content. The DMS determines whether it is transmitting the content to the DMR or the DMP.

If the DMR or the DMP is buffering the content, (i.e., the DMS is transmitting the content to the DMR or the DMP in step 404, the DMS maintains a normal connection state of a WLAN in step 408 and transmits the content to the DMR or the DMP through the WLAN.

If the DMR or the DMP is not buffering the content, (i.e., the DMS has completed the transmission of the content to the DMR or the DMP in step 404), the DMS transitions the WLAN to a power save mode in step 406.

In step 408, the DMS determines whether the DMR or the DMC or DMP disconnects from the WLAN (e.g., if a WLAN connection is difficult to maintain due to an increase in the distance from the DMR or the DMC). If the DMR or the DMC or the DMP disconnects from the WLAN in step 408, the DMS notifies the user of the WLAN state through a pop-up window in step 410. In step 412, the DMS disconnects the WLAN to reduce the power consumption, if a predetermined time elapses without roaming.

On the other hand, if the DMR or the DMC or DMP does not disconnect from the WLAN (in step 408), the DMS continues to supply power to the WLAN or to maintain the power save mode.

Meanwhile, because the DMS cannot know whether the DMR disconnects from the network, the DMS always converts to a standby mode. Accordingly, the DMS may cause power consumption.

An exemplary embodiment of the present invention provides a method for preventing the DMS from causing power consumption in the standby mode, as described below with reference to FIG. 5.

Figure 5:
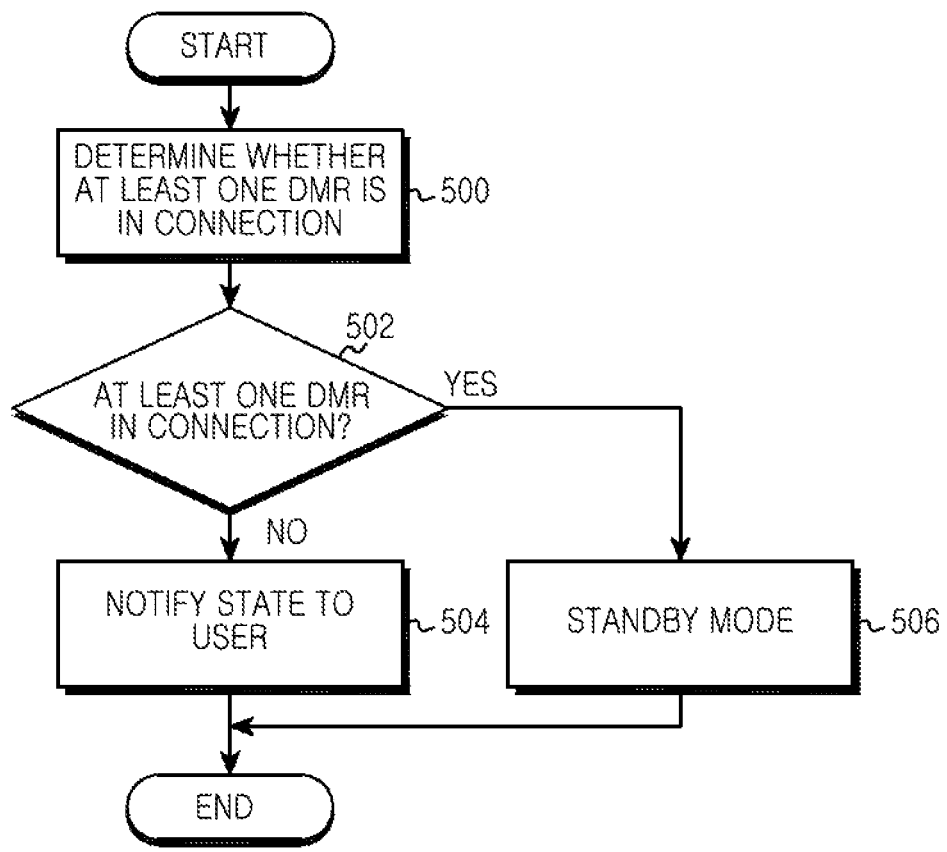
FIG. 5 is flow diagram illustrating a method for operating a digital media server to reduce power consumption in a DLNA network according to another exemplary embodiment of the present invention.

FIG. 5 illustrates a method for operating a DMS to reduce power consumption in a DLNA network according to an exemplary embodiment of the present invention.

Referring to FIG. 5, in step 500, the DMS determines whether at least one DMR is in connection with the DLNA network. If at least one DMR is not connected to the DLNA network in step 502, the DMS notifies the user of the state through a pop-up window after a predetermined time in step 504. The DMS determines the state of the DMR playing the content, and automatically terminates the connection to reduce the power consumption, if the DMR is not connected or there is no command from the DMR for a predetermined time.

If at least one DMR is connected to the DLNA network in step 502 the DMS transitions to a standby mode in step 506.

According to an exemplary embodiment of the present invention, if the content is an image type, a slide show may be executed after downloading all the slide content, in order to reduce a buffering time and a WLAN use time. Thereafter, the WLAN is disconnected to reduce the power consumption.

Figure 6:
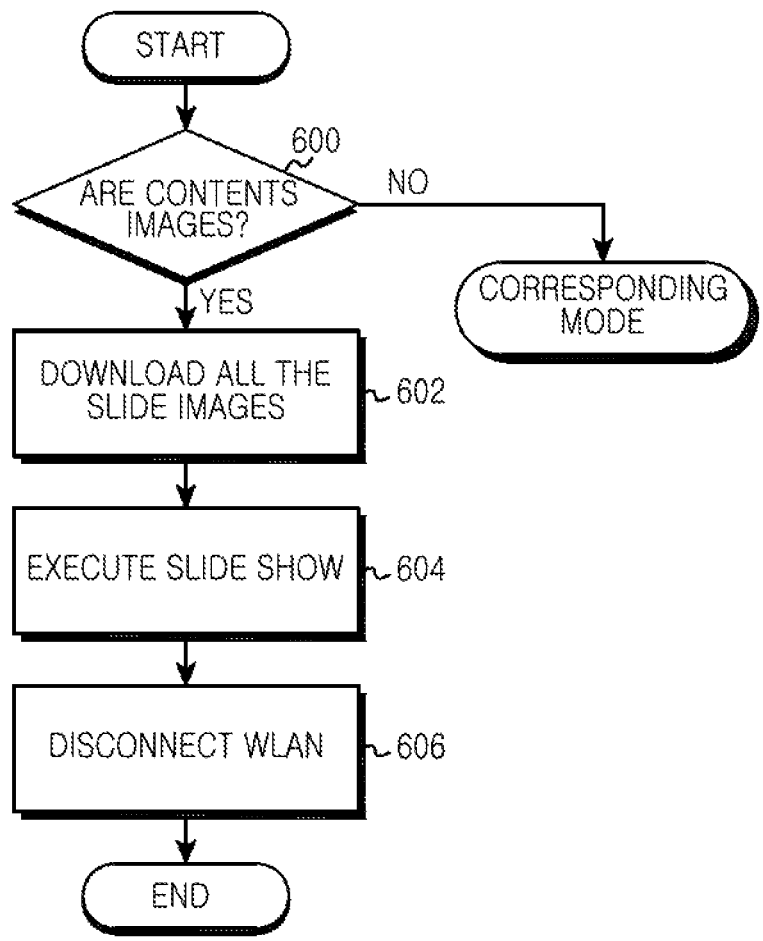
FIG. 6 is flow diagram illustrating a method for operating a digital media player or a digital media renderer to reduce power consumption in a DLNA network according to an exemplary embodiment of the present invention.

FIG. 6 illustrates a method for operating a DMP or the DMR to reduce power consumption in the DLNA network according to an exemplary embodiment of the present invention.

Referring to FIG. 6, in step 600, the DMP or the DMR determines whether the content received from the DMS is slide content such as images. If the content received from the DMS is slide content, such as images in step 600, the DMP or the DMR downloads all the slide content in step 602. The DMP or the DMR does not execute a slide show until all the slide content is received.

In step 604, the DMP or the DMR executes a slide show after receiving all the slide content. In step 60, the DMP or the DMR disconnects the WLAN.

FIGS. 7A to 7G illustrate a display screen for setting DLNA in a portable device according to an exemplary embodiment of the present invention. The portable device may be, for example, a DMS, a DMR, or a DMP.

Figure 7A:
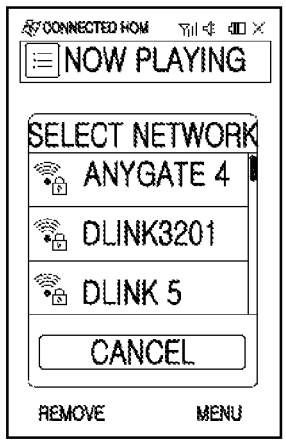
FIGS. 7A to 7G are diagrams illustrating a display screen for setting DLNA in a portable device according to an exemplary embodiment of the present invention.
Figure 7B:
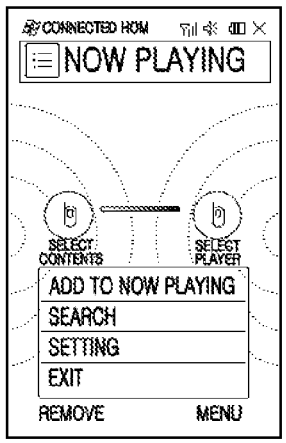
Figure 7C:
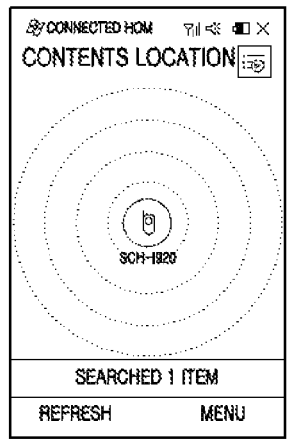
Figure 7D:
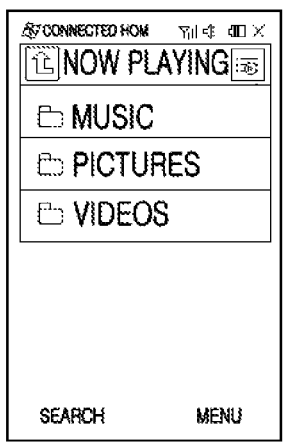
Figure 7E:
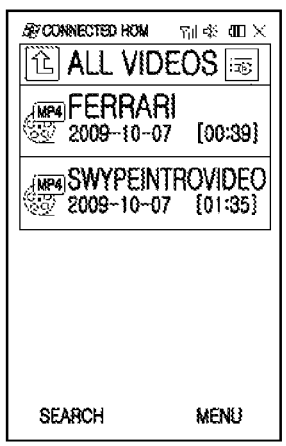
Figure 7F:
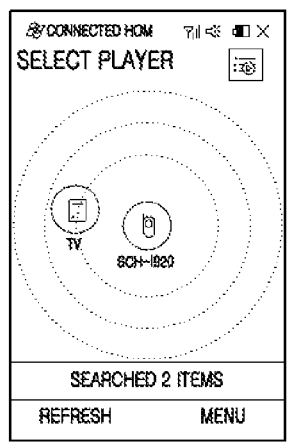
Figure 7G:
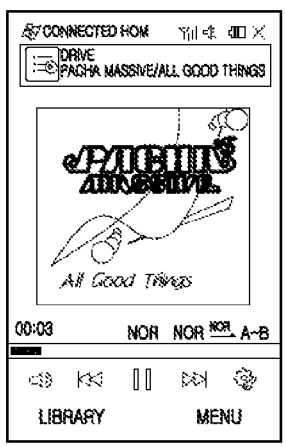

FIG. 7A illustrates a network selection screen of the portable device. FIG. 7B illustrates a content selection setting screen with a digital media server (DMS). FIG. 7C illustrates a server selection screen of the portable device. FIG. 7D illustrates a content (e.g., music, pictures and videos) selection screen of the portable device. FIG. 7E illustrates a file selection screen of the portable device. FIG. 7F illustrates a renderer (DMP or DMR) selection screen. FIG. 7G illustrates a play screen in the renderer.

Although an LCD is illustrated herein as a display of the portable device, exemplary embodiments of the present invention are not limited thereto. Additional examples of the display include a Plasma Display Panel (PDP) and Light Emitting Diode (LED).

According to an exemplary embodiment of the present invention as described above, the state of a WLAN chip and a display is controlled according to the state of a DLNA supporting device in a DLNA network, thereby making it possible to minimize the power consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a digital media renderer to reduce power consumption in a Digital Living Network Alliance (DLNA) network, the method comprising:
   receiving media content from a digital media server via a Wireless Local Area Network (WLAN);
   establishing a control state based on the received media content;
   controlling the power of at least one of a communication connection device and a display according to the control state of the received media content;
   determining whether a buffering operation is in progress;
   determining whether the digital media renderer also performs functions of a digital media player;
   transitioning the WLAN, when it has been determined that a buffering operation is not in progress and that the digital media player functions are not performed by the digital media renderer, to a power save mode; and
   disconnecting the WLAN, when it has been determined that a buffering operation is not in progress and that the digital media player functions are performed by the digital media renderer,
   wherein the digital media renderer comprises the communication connection device.

2. The method of claim 1, further comprising:
   disconnecting the power of the communication connection device after completion of buffering of the received media content.

3. The method of claim 1, further comprising:
   transitioning the communication connection device to a power save mode after completion of buffering of the received media content.

4. The method of claim 1, wherein the display comprises one of a Liquid Crystal Display (LCD), a Light Emitting Diode (LED), and a Plasma Display Panel (PDP).

5. The method of claim 1, wherein if the received media content comprises slide content, the power of the communication connection device is disconnected after all of the slide content is received.

6. The method of claim 1 wherein the establishing of the control state based on received media content comprises:
   determining whether an operation state is a pause state, a play state, or a stop state.

7. The method of claim 6, further comprising:
   turning on the display, when a play state has been determined as the operation state;
   turning off the display, when a stop state has been determined as the operation state; and
   dimming the display, when a pause state has been determined as the operation state, and has persisted for a predetermined amount of time.

8. The method of claim 7, further comprising:
   proceeding to a corresponding mode when the operation state has been determined as the stop state; and
   waiting for a control signal from the digital media controller.

9. A method for operating a digital media server to reduce power consumption in a Digital Living Network Alliance (DLNA) network, the method comprising:
   determining whether there is a user operation;
   determining whether a digital media renderer or a digital media player is in a connection state with a Wireless Local Area Network (WLAN);
   notifying the user of the WLAN state when it is determined that the digital media renderer or the digital media player is not in a connection state with the WLAN; and
   terminating the connection if the digital media renderer or the digital media player is not in the connection state or if there is no command from the digital media renderer or the digital media player for a predetermined time,
   wherein the digital media server turns off a display when there is no user operation.

10. The method of claim 9,
    wherein the notifying the user of the WLAN state comprises displaying a pop-up window to the user.

11. The method of claim 10, wherein the display connected to the digital media server is turned off regardless of the state of the digital media renderer or the digital media player.

12. A method for operating a digital media server to reduce power consumption in a Digital Living Network Alliance (DLNA) network, the method comprising:
    determining whether at least one digital media renderer or digital media player are in a connection state;
    notifying a user of the connection state of the at least one digital media renderer or the digital media player if at least one digital media renderer or digital media player is not in the connection state;
    transmitting digital media content, via a Wireless Local Area Network (WLAN), to the digital media renderer or the digital media player; and
    transitioning the WLAN to power save mode when the digital media content transmission is complete.

13. The method of claim 12, further comprising:
    disconnecting the power of the communication connection device after displaying a pop-up window to a user when the communication connection device of the digital media server is disconnected.

14. A method for reducing power consumption in a Digital Living Network Alliance (DLNA) network, the method comprising:
    controlling the power of a display according to a control state of media content received from a digital media server;
    disconnecting the power of a communication connection device after completion of buffering the received media content when the communication connection device performs the functions of a digital media player;

converting the communication connection device to a power save mode after completion of buffering the received media content when the communication connection device does not perform functions of a digital media player; and disconnecting the power of the communication connection device after displaying a pop-up window to a user, when the communication connection device is disconnected from the DLNA network.

15. The method of claim 14, wherein the controlling of the power of the display according to the control state of media content received from a digital media server comprises:

turning on the display when playing the received media content;

turning off the display when stopping the playing of the received media content; and dimming the display when pausing the received media content.

16. The method of claim 14, wherein if the received media content comprises slide content, the method plays the slide content and disconnects the power of the communication connection device after all the slide content is received.

17. A system for reducing power consumption in a Digital Living Network Alliance (DLNA) network, the system comprising:

a Wireless Local Area Network (WLAN);

a digital media renderer for controlling the power of a display according to a control state of media content received from a digital media server, for disconnecting the power of a communication connection device or converting the communication connection device to a power save mode after completion of buffering the received media content, and for interrupting the power of the communication connection device after displaying a pop-up window to a user when the communication connection device is disconnected from the WLAN; and a digital media server for determining whether the digital media renderer is in a connection state with the WLAN, for terminating the connection if the digital media renderer is not in the connection state, for determining whether there is a user operation of the digital media renderer, and for turning off a connected display when there is no determined user operation.

18. The system of claim 17, wherein when the communication connection device is connected, the digital media server interrupts the power of the communication connection device after displaying a pop-up window to a user.

19. The system of claim 17, wherein the digital media server turns off the display connected to the digital media server, regardless of the state of the digital media renderer.

* * * * *